(12) United States Patent  
Holopainen et al.

(10) Patent No.: US 12,422,336 B2  
(45) Date of Patent: Sep. 23, 2025

(54) METHOD, AN ARRANGEMENT AND A FREQUENCY CONVERTER FOR CONTROLLING VIBRATION OF AN ELECTRIC MACHINE

(71) Applicant: ABB Schweiz AG, Baden (CH)

(72) Inventors: Timo Holopainen, Helsinki (FI); Olli Liukkonen, Helsinki (FI); Janne Roivainen, Helsinki (FI); Tommi Ryyppö, Helsinki (FI); Aron Szucs, Helsinki (FI)

(73) Assignee: ABB Schweiz AG, Baden (CH)

( * ) Notice: Subject to any disclaimer, the term of this patent is extended or adjusted under 35 U.S.C. 154(b) by 82 days.

(21) Appl. No.: 17/812,828

(22) Filed: Jul. 15, 2022

(65) Prior Publication Data

US 2023/0017735 A1 Jan. 19, 2023

(30) Foreign Application Priority Data

Jul. 15, 2021 (EP) .................................... 21185874

(51) Int. Cl.
  *G01M 13/045* (2019.01)
  *G01H 17/00* (2006.01)
  (Continued)

(52) U.S. Cl.
  CPC .......... *G01M 13/045* (2013.01); *G01H 17/00* (2013.01); *H02P 23/30* (2016.02); *H02P 25/024* (2016.02)

(58) Field of Classification Search
  CPC ...... G01M 13/045; G01H 17/00; H02P 23/30; H02P 25/024; H02P 27/06; H02P 27/04
  See application file for complete search history.

(56) References Cited

U.S. PATENT DOCUMENTS

2017/0366128 A1* 12/2017 Vaks .................... H02P 25/092
2018/0258926 A1   9/2018 Jackle et al.

FOREIGN PATENT DOCUMENTS

| CN | 202614528 U | 12/2012 |
| CN | 103259467 A | 8/2013 |

(Continued)

OTHER PUBLICATIONS

European Search Report; Application No. EP 21 18 5874; Completed: Dec. 3, 2021; 3 Pages.

(Continued)

*Primary Examiner* — Lisa M Caputo
*Assistant Examiner* — Cynthia L Davis
(74) *Attorney, Agent, or Firm* — Whitmyer IP Group LLC

(57) ABSTRACT

A field of electric drive devices and electric machines, such as electric motors and electric generators for industrial applications, and more particularly to a method, an arrangement and a frequency converter for controlling lateral vibration of an electric machine. The arrangement of the present invention for controlling lateral vibration of an electric machine includes a frequency converter, one or more vibration sensors and an electric machine, wherein the one or more vibration sensors is/are arranged for measuring the lateral vibration from the electric machine and for producing measured vibration data; and wherein the frequency converter is arranged for generating a control torque for exerting the control torque on the stator of the electric machine, the control torque being determined utilizing the measured vibration data.

13 Claims, 7 Drawing Sheets

(51) Int. Cl.
*H02P 23/30* (2016.01)
*H02P 25/024* (2016.01)

(56) References Cited

FOREIGN PATENT DOCUMENTS

| | | | | |
|---|---|---|---|---|
| CN | 105372064 | A | 3/2016 | |
| CN | 106969915 | A | 7/2017 | |
| CN | 107014612 | A | 8/2017 | |
| CN | 107014613 | A | 8/2017 | |
| CN | 107024351 | A | 8/2017 | |
| CN | 206772744 | U | 12/2017 | |
| EP | 1871003 | A1 | 12/2007 | |
| EP | 2754889 | A1 * | 7/2014 | ........... F03D 7/0272 |
| EP | 3410575 | A1 * | 12/2018 | ............. H02K 11/20 |
| EP | 3480939 | A1 | 5/2019 | |
| JP | H07324972 | A | 12/1995 | |

OTHER PUBLICATIONS

European Office Action; Application No. 21185874.1; Issued Nov. 11, 2024; 6 Pages.

* cited by examiner

METHOD, AN ARRANGEMENT AND A FREQUENCY CONVERTER FOR CONTROLLING VIBRATION OF AN ELECTRIC MACHINE

TECHNICAL FIELD

The present invention relates to the field of electric drive devices and electric machines, such as electric motors and electric generators for industrial applications, and more particularly to a method, an arrangement and a frequency converter for controlling lateral vibration of an electric machine.

BACKGROUND

Electric drive arrangements are widely used for industrial applications, e.g. for providing and controlling electrical power and energy to various public and industrial applications as well as for driving and controlling various public and industrial applications. Electric drives are used in industry for different applications, such as for driving motors within the transportation industry, for driving different devices within the process and manufacturing industry as well as within the energy industry. There are applications commonly used for electric drives within the transportation industry for example in metro and railway traffic applications as well as in ship propulsion unit applications of the marine industry. Within the process and manufacturing industry, electric drives can be used for example in conveyer applications, in mixer applications or even in paper machine applications. Within the energy industry, electric drives can be used for example as electric drives for wind turbines of the wind power industry.

Electric drives for electric machines, such as for electric motors and electric generators, may be divided into DC drives (DC, direct current) and AC drives (AC, alternating current). E.g. in a DC motor of a DC drive, a magnetic field is generated by the current through the field winding in the stator. This magnetic field is always maintained at right angles to the field generated by the armature winding. In this way, a DC motor's torque is generated, which torque can then be easily controlled in a DC drive by changing the armature current and keeping the magnetizing current constant. In a DC drive, also the DC motor speed can be controlled directly through armature current.

Within electric drives, the AC drives may further be divided into frequency-controlled AC drives, flux-vector-controlled AC drives and into AC drives utilising direct torque control (DTC, Direct Torque Control). In flux-vector-controlled AC drives and in direct torque control AC drives the torque of the three-phase motor or generator can be controlled, whereas in frequency controlled AC drives the driven/driving machine dictates the torque level.

The avoidance of resonances strongly affects the structural design of large electric motors or generators. Traditionally, the dimensions of critical structural members are adjusted to fulfil this resonance criterion. There are some methods to decrease the excitation forces and increase damping of the bearings. Only in some exceptional cases, additional damping elements have been introduced to control vibrations of the lowest modes, i.e. the lowest natural frequencies.

In electric machines, the foundations of the electric machine may vary significantly. Avoidance of resonances is usually the main design principle related to the electric machine vibrations. If foundation properties of the electric machine are known in site conditions, the vibration behaviour can be predicted, and the potential risks identified. In some cases, the corrective actions can be achieved by well-defined structural arrangements.

In some cases, resonances can be avoided by separating the critical speeds, such as natural frequencies, from the operating speed range of the electric machine. However, the natural frequencies of the foundation system may differ a lot depending on the on-site conditions. The main difference is the change of natural frequencies as they are strongly affected by the flexible foundation. Occasionally but not every time, some harmful resonance vibrations are observed during the commissioning and operation of electric machines. However, the avoidance of all resonances is very difficult to achieve, even on a rigid foundation, e.g. due to the large operating speed range of many VFD motors (VFD, variable frequency drive).

Nowadays, the active vibrations control applications are very rare with motor installations and electrical machines. The electrical machines with active magnetic bearings (AMB) provide one example of these applications. However, in practice, the large cost of active vibration control solutions has prevented their use in standard motor installations and electrical machines.

In today's demanding environment, there is a need for a more efficient and easier solution for a method, an arrangement and a frequency converter for controlling lateral vibration of an electric machine and a need for a solution for an electric machine, the controlled vibration of which can be more efficiently maintained. There is a demand in the market for a method, an arrangement and a frequency converter for controlling lateral vibration of an electric machine that would be easy to apply and more efficient than the current prior art solutions.

SUMMARY

The object of the invention is to introduce method, an arrangement and a frequency converter for controlling lateral vibration of an electric machine and for a solution for an electric machine, the controlled vibration of which can be more efficiently maintained. Advantageous embodiments are furthermore presented.

It is brought forward a new method for controlling lateral vibration of an electric machine, in which method: lateral vibration from said electric machine is measured by one or more vibration sensors as measured vibration data; control torque is determined utilizing said measured vibration data; and control torque is generated by said frequency converter and exerted on the stator of said electric machine.

In a preferred embodiment of said method, wherein in generating said control torque: a control torque reference is calculated by said frequency converter; and control torque is generated by said frequency converter corresponding to said control torque reference.

In a preferred embodiment of said method, said exerted control torque is used for suppression of horizontal vibration of said electric machine.

In a preferred embodiment of said method, said measured vibration data is utilized for suppression of lateral vibration of said electric machine.

In a preferred embodiment of said method, said exerted control torque is used for producing a variation of horizontal displacement of said electric machine.

In a preferred embodiment of said method, said variation of horizontal displacement is utilized for vibration suppression of said electric machine.

In a preferred embodiment, lateral vibration from said electric machine is measured from the bearings of said electric machine.

Furthermore, it is brought forward a new arrangement for controlling lateral vibration of an electric machine, said arrangement comprising a frequency converter, one or more vibration sensors and an electric machine, wherein said one or more vibration sensors is/are arranged for measuring the lateral vibration from said electric machine and for producing measured vibration data; and wherein said frequency converter is arranged for generating a control torque and for exerting said control torque on the stator of said electric machine, said control torque being determined utilizing said measured vibration data.

In a preferred embodiment of said arrangement, in generating said control torque: a control torque reference is calculated by said frequency converter; and control torque is generated by said frequency converter corresponding to said control torque reference.

In a preferred embodiment of said arrangement, said exerted control torque is used for suppression of horizontal vibration of said electric machine.

In a preferred embodiment of said arrangement, said measured vibration data is utilized for suppression of lateral vibration of said electric machine.

In a preferred embodiment of said arrangement, said exerted control torque is used for producing a variation of horizontal displacement of said electric machine.

In a preferred embodiment of said arrangement, said variation of horizontal displacement is utilized for vibration suppression of said electric machine.

In a preferred embodiment, said one or more vibration sensors comprise a sensor attached to the bearings of said electric machine.

In a preferred embodiment, said frequency converter comprises: a data gathering unit arranged for gathering data, said gathered data including control data for said electric machine and measured vibration data of said electric machine; and a data analysis unit arranged for analysing said gathered data and for determining the control torque for controlling lateral vibration of said electric machine.

In a preferred embodiment, said arrangement comprises a data analysis system, and wherein said frequency converter comprises: a data gathering unit arranged for gathering data, said gathered data including control data for said electric machine and measured vibration data of said electric machine; and a connection unit arranged for transmitting said gathered data to said data analysis system, wherein said data analysis system is arranged for analysing said gathered data and for determining the control torque for controlling lateral vibration of said electric machine.

In a preferred embodiment, said arrangement comprises a user apparatus, and wherein said connection unit arranged for transmitting said gathered data to said data analysis system via said user apparatus, and wherein said user apparatus is arranged for receiving measured vibration data of said electric machine from said one or more vibration sensors and for receiving said gathered data from said connection unit and for forwarding said gathered data to said data analysis system.

Furthermore, it is brought forward a new frequency converter for controlling lateral vibration of an electric machine, which frequency converter is arranged: to receive vibration data from one or more vibration sensors arranged for measuring the lateral vibration from said electric machine and for producing measured vibration data; and to generate a control torque for exerting said control torque on the stator of said electric machine, said control torque being determined utilizing said measured vibration data.

In a preferred embodiment of said frequency converter, in generating said control torque: a control torque reference is calculated by said frequency converter; and control torque is generated by said frequency converter corresponding to said control torque reference.

In a preferred embodiment of said frequency converter, said exerted control torque is used for suppression of horizontal vibration of said electric machine.

In a preferred embodiment of said frequency converter, said measured vibration data is utilized for suppression of lateral vibration of said electric machine.

In a preferred embodiment of said frequency converter, said exerted control torque is used for producing a variation of horizontal displacement of said electric machine.

In a preferred embodiment of said frequency converter, said variation of horizontal displacement is utilized for vibration suppression of said electric machine.

In a preferred embodiment, said frequency converter comprises: a data gathering unit arranged for gathering data, said gathered data including control data for said electric machine and measured vibration data of said electric machine; and a data analysis unit arranged for analysing said gathered data and for determining the control torque for controlling lateral vibration of said electric machine.

BRIEF DESCRIPTION OF THE DRAWINGS

In the following, the present invention will be described in more detail by way of example and with reference to the attached drawings, in which.

The foregoing aspects, features and advantages of the invention will be apparent from the drawings and the detailed description related thereto.

In the following, the invention will be described in greater detail by means of preferred embodiments with reference to the accompanying drawings of FIGS. 1 to 8.

DETAILED DESCRIPTION

The arrangement for controlling lateral vibration of an electric machine according to one embodiment of the present invention comprises a frequency converter, one or more vibration sensors and an electric machine, wherein said one or more vibration sensors is/are arranged for measuring the lateral vibration from said electric machine and for producing measured vibration data; and wherein said frequency converter is arranged for generating a control torque and for exerting said control torque on the stator of said electric machine, said control torque being determined utilizing said measured vibration data.

Avoidance of resonances is the main design principle related to the vibrations of electrical machines such as an electrical motor in a motor installation. This can be achieved by well-defined structural arrangements. Sometimes, this is complicated by the variation of motor foundations on site and by the large operating speed range of some VFD motors (VFD, variable frequency drive).

For example, when the motor is mounted on a flexible foundation, as on a steel skid, the vibration behaviour may differ clearly from that observed in the factory acceptance test on a rigid foundation. The main difference is the change of natural frequencies as they are strongly affected by the flexible foundation. In one typical example, the decrease of the few lowest natural frequencies was between 12.5% to 49.9%.

The support provided by the foundation of the electric machine for the natural frequencies is very significant. In case the natural frequencies of the electric machine are excited, the vibration is transmitted effectively to the foundation.

In electrical machines, such as in electric motors and in electric generators, an action torque is the torque rotating the rotor and the driven/driving machine. In the present invention, there is generated a reactive control torque, which is exerted on the stator. This reactive control torque is a control torque that acts in the opposite direction to said action torque and is used to control the vibrations of the machine. This control torque is particularly effective to control the horizontal modes where both ends of the motor move horizontally in the same phase. The first of these horizontal modes is usually the lowest of all motor modes and the natural frequency of the second of these horizontal modes of some large motors may be, for example, in the range of 100-120 Hz.

Figure 1:
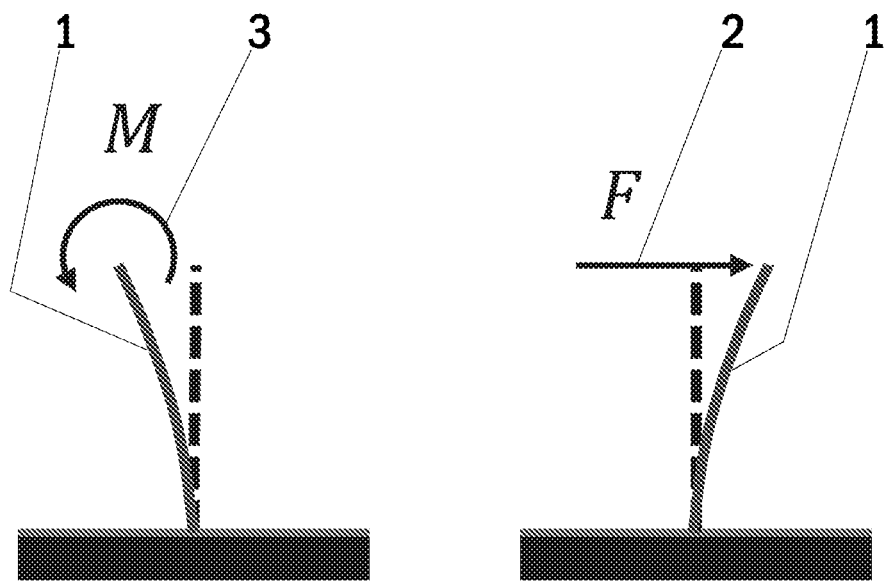
FIG. 1 illustrates an example of a cantilever beam demonstrating the principle of controlling vibration of an electric machine according to the present invention.

FIG. 1 illustrates an example of a cantilever beam demonstrating the principle of controlling vibration of an electric machine according to the present invention. In FIG. 1 a motor is shown on foundation as like a cantilever beam 1. In the right-side illustration of FIG. 1, a lateral force F indicated with reference number 2, said lateral force F inducing a displacement of said cantilever beam 1 towards a first direction. In the left side illustration of FIG. 1, a rotational moment M indicated with reference number 3, said rotational moment M inducing a displacement of said cantilever beam 1 towards a second direction opposite to said first direction. The principle of controlling vibration of an electric machine according to the present invention is to compensate the vibration displacement by generating an equivalent horizontal displacement due to control torque.

In the present invention, there is generated a control torque, which is exerted on the stator. This control torque is used to control the vibrations of the machine. This control torque is particularly effective to control the horizontal modes where both ends of the motor move horizontally in the same phase. The first of these horizontal modes is usually the lowest of all motor modes and the natural frequency of the second of the horizontal modes of some large motors may be, for example, in the range of 100-120 Hz.

Figure 2:
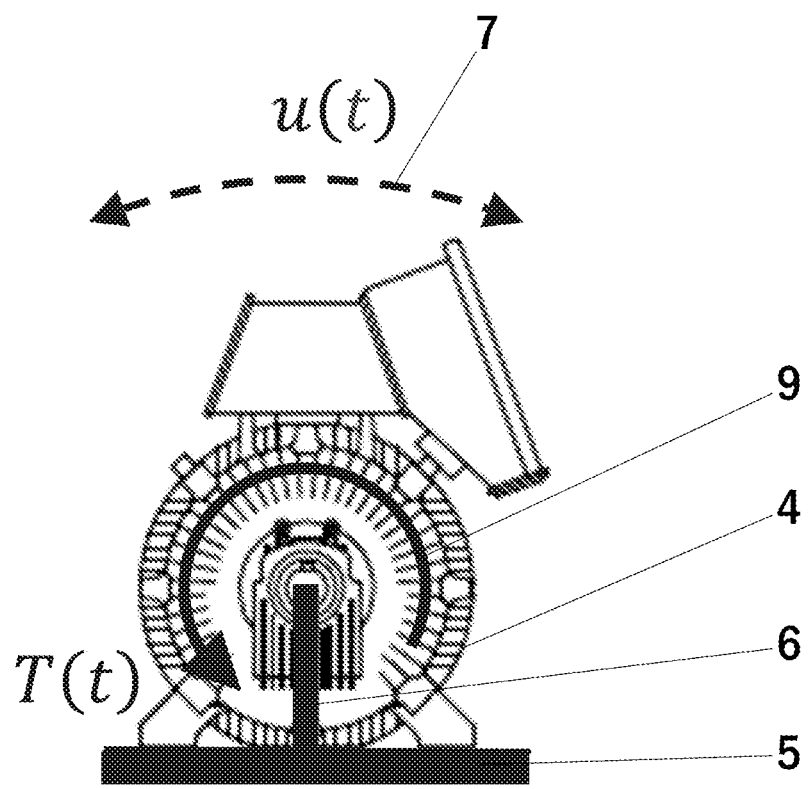
FIG. 2 illustrates a principle of generating of an equivalent horizontal displacement due to control torque in controlling horizontal vibration of an electric machine according to the present invention.

FIG. 2 illustrates a principle of generating of an equivalent horizontal displacement due to control torque in controlling horizontal vibration of an electric machine according to the present invention. In FIG. 2 a motor 4 is shown on a foundation 5 also demonstrated by a cantilever beam 6. The horizontal vibrational displacement u(t) of the motor 4 due to the horizontal vibrations is indicated with reference number 7. When the frequency converter together with the motor produces the mechanical torque on the rotating rotor causing simultaneously a control torque variation T(t) indicated with reference number 9, which is exerted on the stator. This control torque is used to compensate the horizontal vibrational displacement u(t) of the motor 4.

In the present invention, the frequency converter together with the motor produces a mechanical torque, i.e. an active torque on the rotating rotor for power transfer. This active torque is balanced by a control torque exerted on the cylindrical inner surface of the stator core.

The electromechanical power conversion is carried out in the air gap between the rotor and stator. This conversion yields the active torque exerted on the rotor and the torque exerted on stator. The amplitude of these mechanical torques are equal, but they act in opposite directions, both in static and dynamic conditions.

Figure 3:
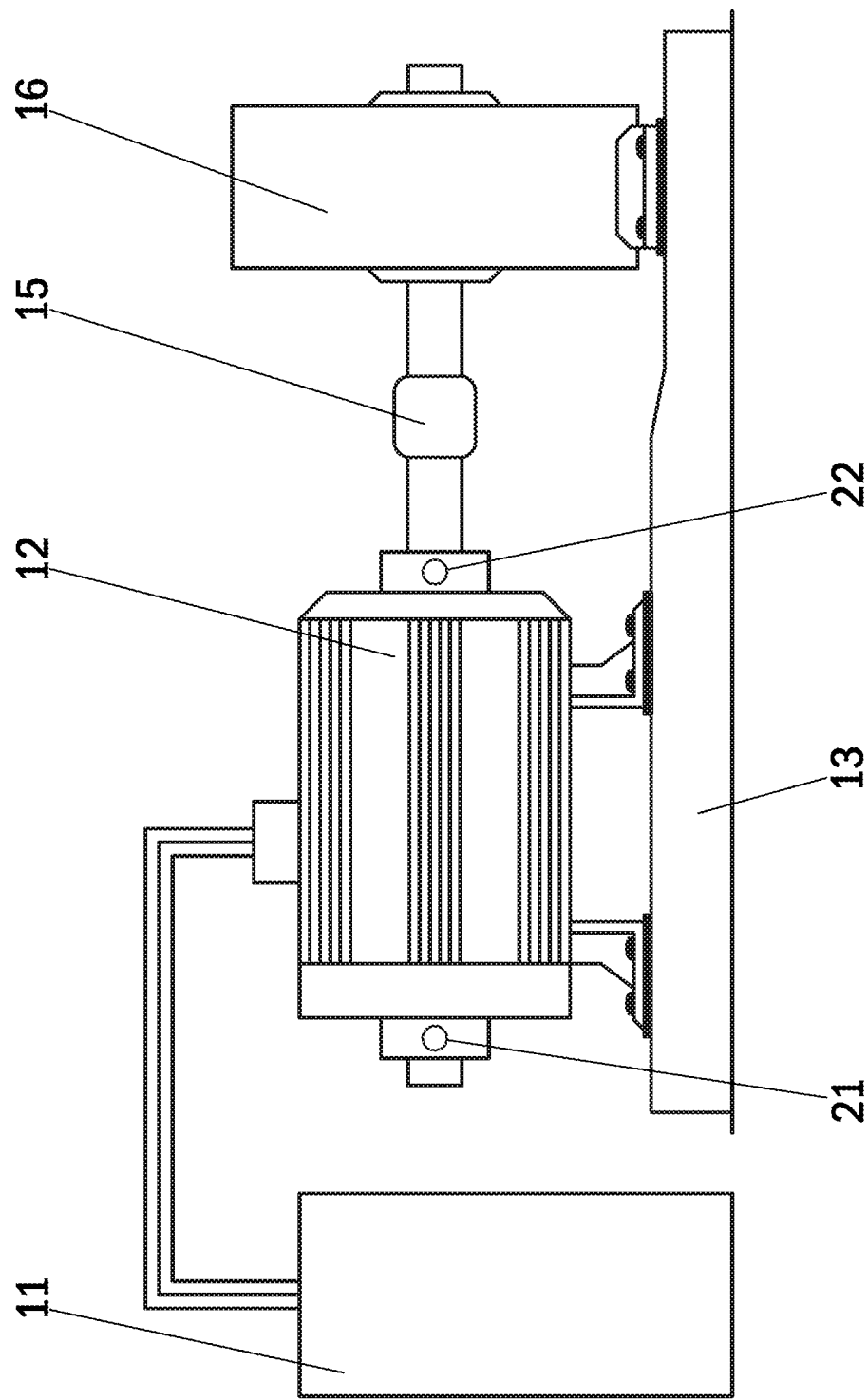
FIG. 3 illustrates a diagram of an embodiment of an arrangement for controlling lateral vibration of an electric machine according to the present invention.

FIG. 3 illustrates a diagram of an embodiment of an arrangement for controlling lateral vibration of an electric machine according to the present invention. The presented embodiment of an arrangement for controlling lateral vibration of an electric machine comprises a frequency converter 11 and an electric machine 12. In the presented embodiment said electric machine 12 is a motor 12, which motor 12 is installed on a motor foundation 13. In the presented embodiment, a driven/driving machine system 16 is connected to said motor 12 via a coupling arrangement 15. Whereas in the presented embodiment a driven machine 16 connected to said motor 12 is shown as a driven/driving machine 16, in another embodiment of the present invention the driven/driving machine 16 could be replaced by one or more driven/driving machine devices and/or one or more gears/gear arrangements and/or one or more shafts/shaft systems connected to said electric machine 12. Whereas in the presented embodiment a motor is shown as an electric machine, in another embodiment of the present invention the motor could be replaced by a generator as an electric machine.

In the present invention, the arrangement for controlling lateral vibration of an electric machine comprises a frequency converter, one or more vibration sensors and an electric machine. Said one or more vibration sensors may comprise one or more vibration sensors attached to the bearing/bearings of said electric machine.

In the presented embodiment, said arrangement for controlling lateral vibration of an electric machine comprises one or more vibration sensors 21-22. Said one or more vibration sensors 21-22 may comprise sensors 21-22 installed on the motor 12, for example close to the ends of the motor 12, i.e. close to the motor bearings.

In the presented embodiment of an arrangement for controlling lateral vibration of an electric machine according to the present invention, lateral vibration is measured from the motor by one or more vibration sensors 21-22. When the lateral vibration from the motor is measured, as a result measured vibration data is produced.

Thereafter, a control torque is calculated and determined utilizing said measured vibration data. The calculated control torque used for vibration control varies in time and is a time-dependent function of measured vibrations. Typically, the determined control torque is a periodic function with one or few harmonic components. After the control torque has been calculated and determined, a respective control torque is generated by the frequency converter 11 and said generated control torque is exerted on the stator of said motor 12.

In the calculation and determination of said control torque a control torque reference is first calculated by said frequency converter 11 and thereafter a respective control torque is generated by said frequency converter 11 corresponding to said control torque reference. Said control torque reference may be added as an input reference on a torque controller or a torque control loop of said frequency converter 11. Thereafter, the stator voltage of said motor 12, supplied and controlled by the said frequency converter 11, is arranged to produce a torque to the shaft of said motor 12 which corresponds to said input reference of torque controller.

In the presented embodiment of an arrangement for controlling lateral vibration of an electric machine according to the present invention, the control torque generated by the frequency converter 11 is exerted on the stator and used for production of horizontal motion. Said control torque is used, at least, to control the two important low frequency horizontal vibration modes, where the stator-frame and rotor move horizontally with both ends in the same phase.

In the presented embodiment of an arrangement for controlling lateral vibration of an electric machine according to the present invention, in addition to the main torque there is a dynamic (time dependent) variable action torque exerted on the rotor for controlling vibration. The variable action torque causes a variable control torque as a static by-product, which is achieved by a variable action torque exerted on the rotor. This control torque can be used to produce a variation of horizontal displacement of the motor that can be utilized for vibration suppression of the motor.

Figure 4:
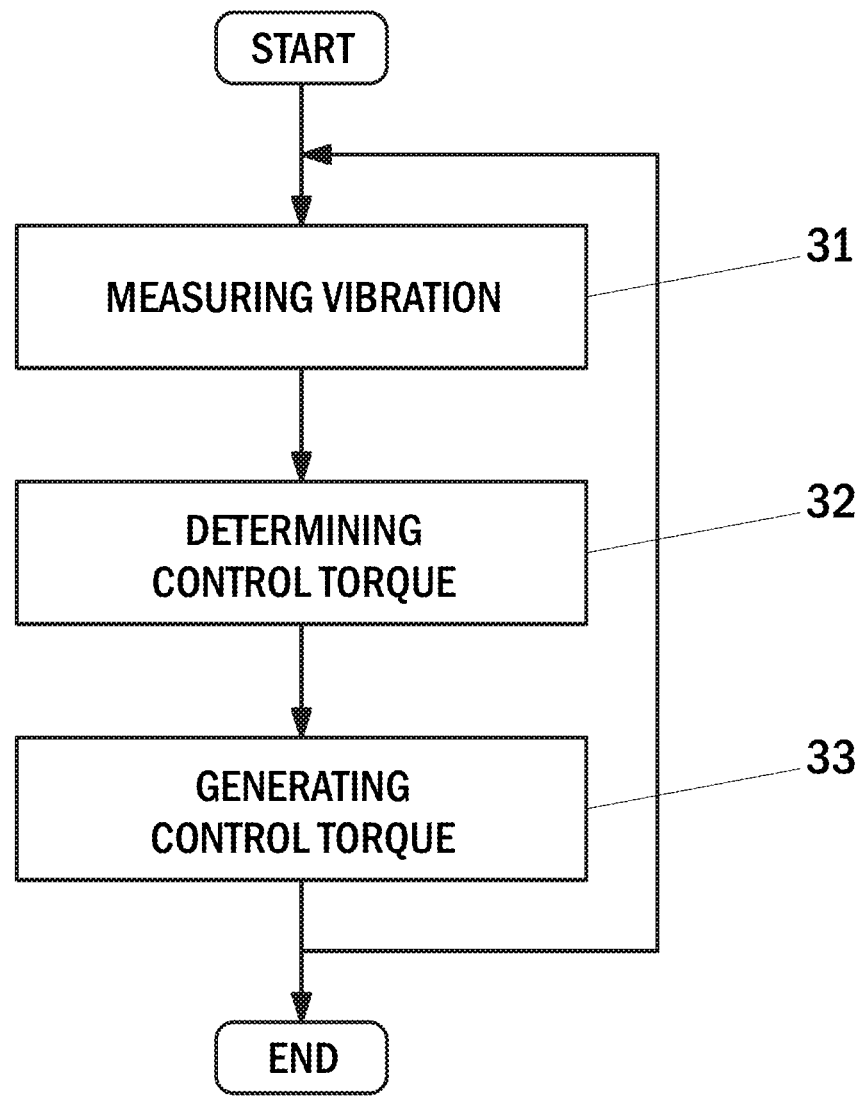
FIG. 4 illustrates a flow diagram of an embodiment of a method for controlling lateral vibration of an electric machine according to the present invention.

FIG. 4 illustrates a flow diagram of an embodiment of a method for controlling lateral vibration of an electric machine according to the present invention. In the method according to the present embodiment, lateral vibration is measured 31 from the electric machine by one or more vibration sensors 21-24. When the lateral vibration from the electric machine is measured 31, as a result measured vibration data is produced.

As the next step, a control torque is calculated and determined 32 utilizing said measured vibration data. In the calculation and determination of said control torque a control torque reference is first calculated by said frequency converter 11 and thereafter a respective control torque is generated by said frequency converter 11 corresponding to said control torque reference. Said control torque reference may be added as an input reference on a torque controller or a torque control loop of said frequency converter 11. Thereafter, the stator voltage of the electric machine, supplied and controlled by the said frequency converter 11, is arranged to produce a torque to the shaft of the electric machine which corresponds to said input reference of torque controller.

In the determining 32 of said control torque, the measured vibration data can be post-processed. After the control torque has been determined 32, a respective control torque is generated 33 by the frequency converter 11 and said generated control torque is exerted on the stator of said electric machine. In the method according to the present embodiment, the steps of measuring vibration 31, determining control torque 32 and generating control torque 33 are repeated several times in a continuous loop, as deemed necessary.

In the method according to the present embodiment, the control torque generated 33 by the frequency converter 11 is exerted on the stator. The control torque is utilized, at least, to control the two important low frequency horizontal vibration modes for vibration suppression. In these vibration modes the stator-frame and rotor move horizontally with both ends in the same phase.

The first horizontal vibration mode is usually the lowest of all vibration modes and the natural frequency of the second horizontal vibration mode of large machines (e.g. frame heights between 250 to 450 mm depending on the type of the electric machine) is close to 100/120 Hz.

Figure 5:
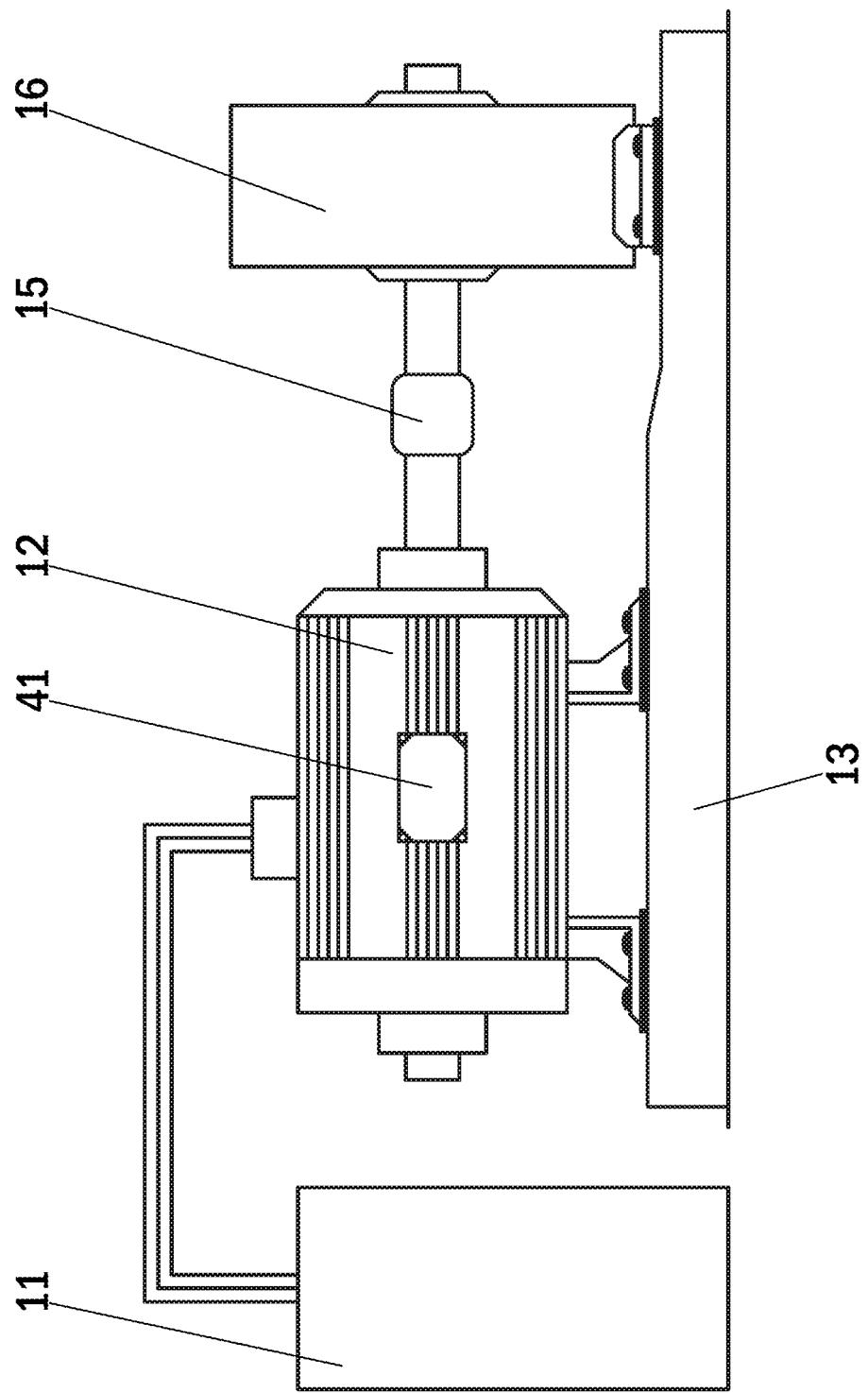
FIG. 5 illustrates a diagram of another embodiment of an arrangement for controlling lateral vibration of an electric machine according to the present invention.

FIG. 5 illustrates a diagram of another embodiment of an arrangement for controlling lateral vibration of an electric machine according to the present invention. The presented another embodiment of an arrangement for controlling lateral vibration of an electric machine comprises a frequency converter 11 and an electric machine 12. In the presented embodiment said electric machine 12 is a motor 12, which motor 12 is installed on a motor foundation 13. In the presented embodiment, a driven/driving machine system 16 is connected to said motor 12 via a coupling arrangement 15. Whereas in the presented embodiment a driven machine 16 is connected to said motor 12 is shown as a driven/driving machine 16, in another embodiment of the present invention the driven/driving machine 16 could be replaced by one or more driven/driving machine devices and/or one or more gears/gear arrangements and/or one or more shafts/shaft systems connected to said electric machine 12. Whereas in the presented embodiment a motor is shown as an electric machine, in another embodiment of the present invention the motor could be replaced by a generator as an electric machine.

In the presented another embodiment, said arrangement for controlling lateral vibration of an electric machine comprises one or more vibration sensors 41. Said one or more vibration sensors 41 may comprise a sensor 41 installed on said motor 12. Said sensor 41 installed on the motor 12 may e.g. be a wireless sensor 41 arranged to measure vibration and arranged to transfer at least the measured vibration data wirelessly. Said sensor 41 installed on the motor 12 may e.g. be a sensor 41 attached to the frame of said motor 12 with a clamping bracket. Said sensor installed on the motor 12 may also be a sensor 41 attached to said motor 12 with mounting clips, mounting brackets, mounting studs, adhesive mounting adapters, mounting screws or other fastening means. Said sensor 41 installed on the motor 12 may be arranged to measure vibration at least in the horizontal direction.

Said one or more vibration sensors 41 may also comprise a sensor installed on the bearing arrangement of the motor or on a bearing housing. Said sensor installed on the bearing housing may e.g. be a wireless sensor arranged to measure vibration and arranged to transfer at least the measured vibration data wirelessly. Said sensor installed on the on the bearing housing may e.g. be a sensor screwed on to a threaded receptacle on the bearing housing.

In the presented another embodiment of an arrangement for controlling lateral vibration of an electric machine according to the present invention, lateral vibration is measured from said motor by one or more vibration sensors 41. When the lateral vibration from the electric machine is measured, as a result measured vibration data is produced. Thereafter, a control torque is calculated and determined utilizing said measured vibration data. The calculated control torque used for vibration control varies in time and is a time-dependent function of measured vibrations. Typically, the determined control torque is a periodic function with one or few harmonic components. After the control torque has been calculated and determined, a respective control torque is generated by the frequency converter 11 and said generated control torque is exerted on the stator of said motor 12.

In the calculation and determination of said control torque a control torque reference is first calculated by said frequency converter 11 and thereafter a respective control torque is generated by said frequency converter 11 corresponding to said control torque reference. Said control torque reference may be added as an input reference on a torque controller or a torque control loop of said frequency converter 11. Thereafter, the stator voltage of said motor 12, supplied and controlled by the said frequency converter 11, is arranged to produce a torque to the shaft of said motor 12 which corresponds to said input reference of torque controller.

In the presented another embodiment of an arrangement for controlling lateral vibration of an electric machine according to the present invention, the control torque generated by the frequency converter 11 is exerted on the stator. The control torque is used, at least, to control the two important low frequency horizontal vibration modes. In these vibration modes the stator-frame and rotor move horizontally with both ends in the same phase. In the presented embodiment of an arrangement for controlling lateral vibration of an electric machine according to the present invention, the generated and exerted torque is a by-product of the main torque exerted on the rotor.

Figure 6:
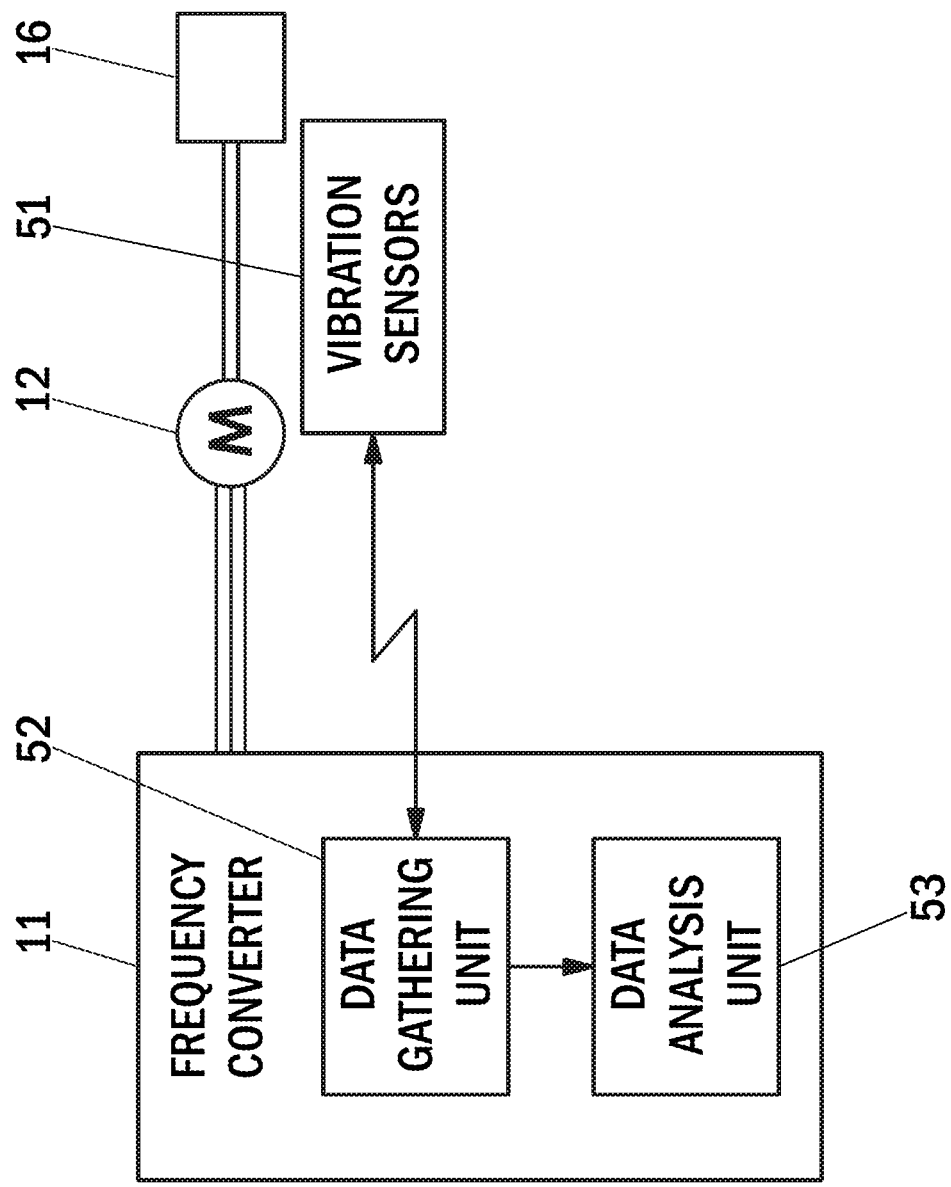
FIG. 6 illustrates a block diagram of a third embodiment of an arrangement for controlling lateral vibration of an electric machine according to the present invention.

FIG. 6 illustrates a block diagram of a third embodiment of an arrangement for controlling lateral vibration of an electric machine according to the present invention. The presented third embodiment of an arrangement for controlling lateral vibration of an electric machine comprises a frequency converter 11, an electric machine 12 and a driven/driving machine system 16 connected to said electric machine 12. The presented third embodiment of an arrangement for controlling lateral vibration of an electric machine comprises one or more vibration sensors 51 installed on the electric machine. Whereas in the presented embodiment a driven machine 16 connected to a motor 12 is shown as a driven/driving machine system 16, in another embodiment of the present invention the driven/driving machine system 16 could be replaced by one or more driven/driving machine devices and/or one or more gears/gear arrangements and/or one or more shafts/shaft systems connected to said electric machine 12. Whereas in the presented embodiment a motor is shown as an electric machine, in another embodiment of the present invention the motor could be replaced by a generator as an electric machine.

In presented third embodiment of an arrangement for controlling lateral vibration of an electric machine, the vibration data gathering and analysis is implemented on the frequency converter 11. In the presented third embodiment, the frequency converter 11 comprises a data gathering unit 52 and a data analysis unit 53.

Said measured vibration data of the electric machine includes vibration data received from the vibration sensors 51. Said data gathering unit 52 of the frequency converter 11 may receive said vibration data from the vibration sensors 51 wirelessly.

The data gathering unit 52 then sends the gathered data to the data analysis unit 53. The data analysis unit 53 then analyses said gathered data and determines, according to the present disclosure, the control torque for controlling lateral vibration of an electric machine. After said determination, the control torque is generated by the frequency converter 11 and exerted on the stator of said motor 12.

Figure 7:
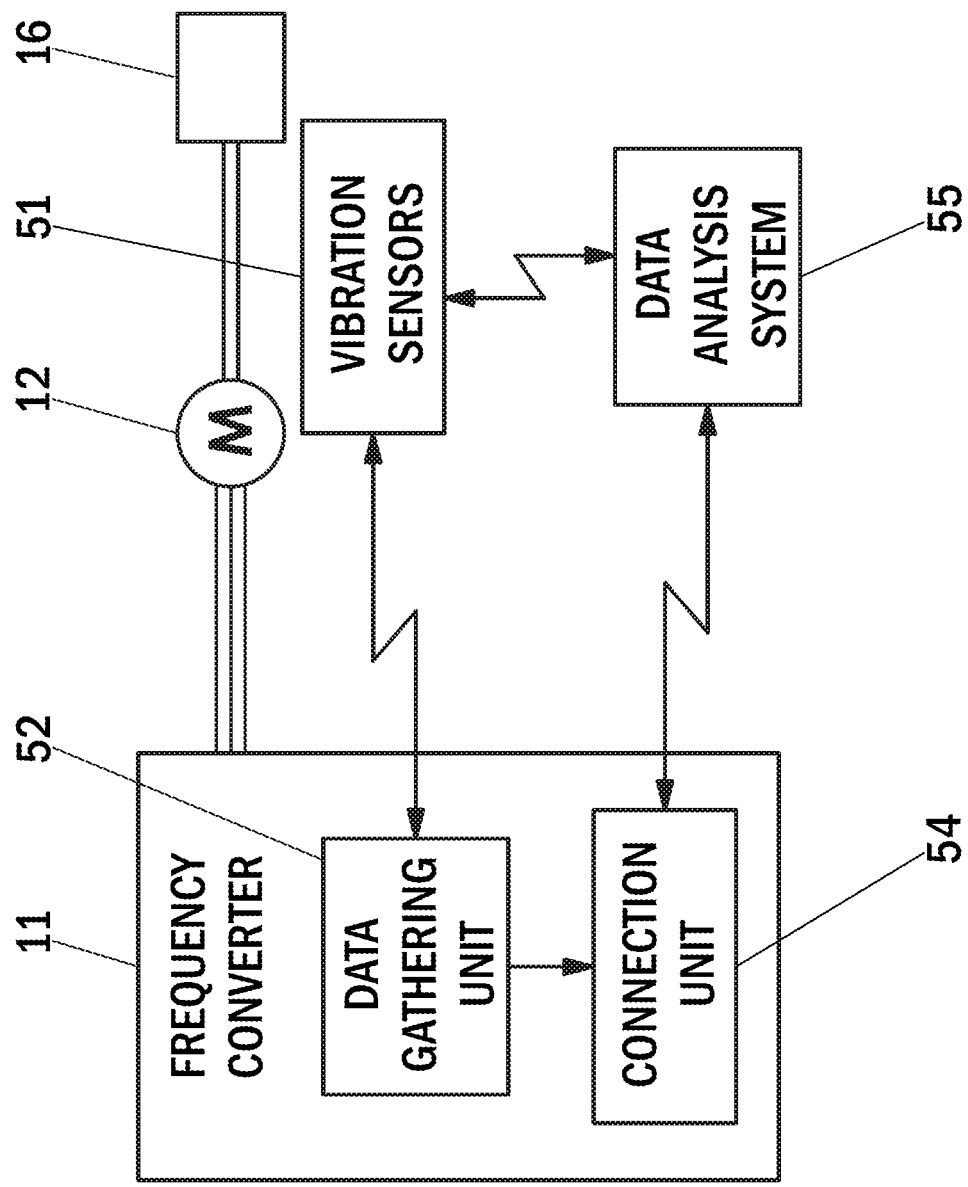
FIG. 7 illustrates a block diagram of a fourth embodiment of an arrangement for controlling lateral vibration of an electric machine according to the present invention.

FIG. 7 illustrates a block diagram of a fourth embodiment of an arrangement for controlling lateral vibration of an electric machine according to the present invention. The presented fourth embodiment of an arrangement for controlling lateral vibration of an electric machine comprises a frequency converter 11, an electric machine 12 and a driven/driving machine system 16 connected to said electric machine 12. The presented fifth embodiment of an arrangement for controlling lateral vibration of an electric machine comprises one or more vibration sensors 51. Whereas in the presented embodiment a driven machine 16 connected to a motor 12 is shown as a driven/driving machine system 16, in another embodiment of the present invention the driven/driving machine system 16 could be replaced by one or more driven/driving machine devices and/or one or more gears/gear arrangements and/or one or more shafts/shaft systems connected to said electric machine 12. Whereas in the presented embodiment a motor is shown as an electric machine, in another embodiment of the present invention the motor could be replaced by a generator as an electric machine.

In presented fourth embodiment of an arrangement for controlling lateral vibration of an electric machine, the vibration data analysis is implemented on an external data analysis system 55. Said external data analysis system 55 may be realized as a partially external data analysis system or as an entirely external data analysis system. In the presented fourth embodiment, the frequency converter 11 comprises a data gathering unit 52 and a connection unit 54.

Said data gathering unit 52 gathers data related to the controlling vibration of an electric machine. Said gathered data may include the measured vibration data of the electric machine received from the vibration sensors 51. Said data gathering unit 52 of the frequency converter 11 may receive said measured vibration data from the vibration sensors 51 wirelessly.

The data gathering unit 52 then forwards said gathered data to the connection unit 54. The connection unit 54 is arranged to receive said gathered data from the data gathering unit 52 and to transmit said gathered data to said data analysis system 55.

The data analysis system 55 is arranged to receive said gathered data from the connection unit 54 of the frequency converter 11. The data analysis system 55 may be implemented in a computer. Said computer may be a laptop, a desktop computer, or a cluster of computer servers, for example. The connection unit 54 may connect to said computer via one or more known communication networks, such as Ethernet, for example. The data analysis system 55 may also receive said measured vibration data directly from the vibration sensors 51. The data analysis system 55 then analyses said gathered data and determines, according to the present disclosure, the control torque for controlling lateral vibration of an electric machine. After said determination, the frequency converter 11 is instructed to generate the control torque. Thereafter, the control torque is generated by the frequency converter 11 and exerted on the stator of said motor 12.

Figure 8:
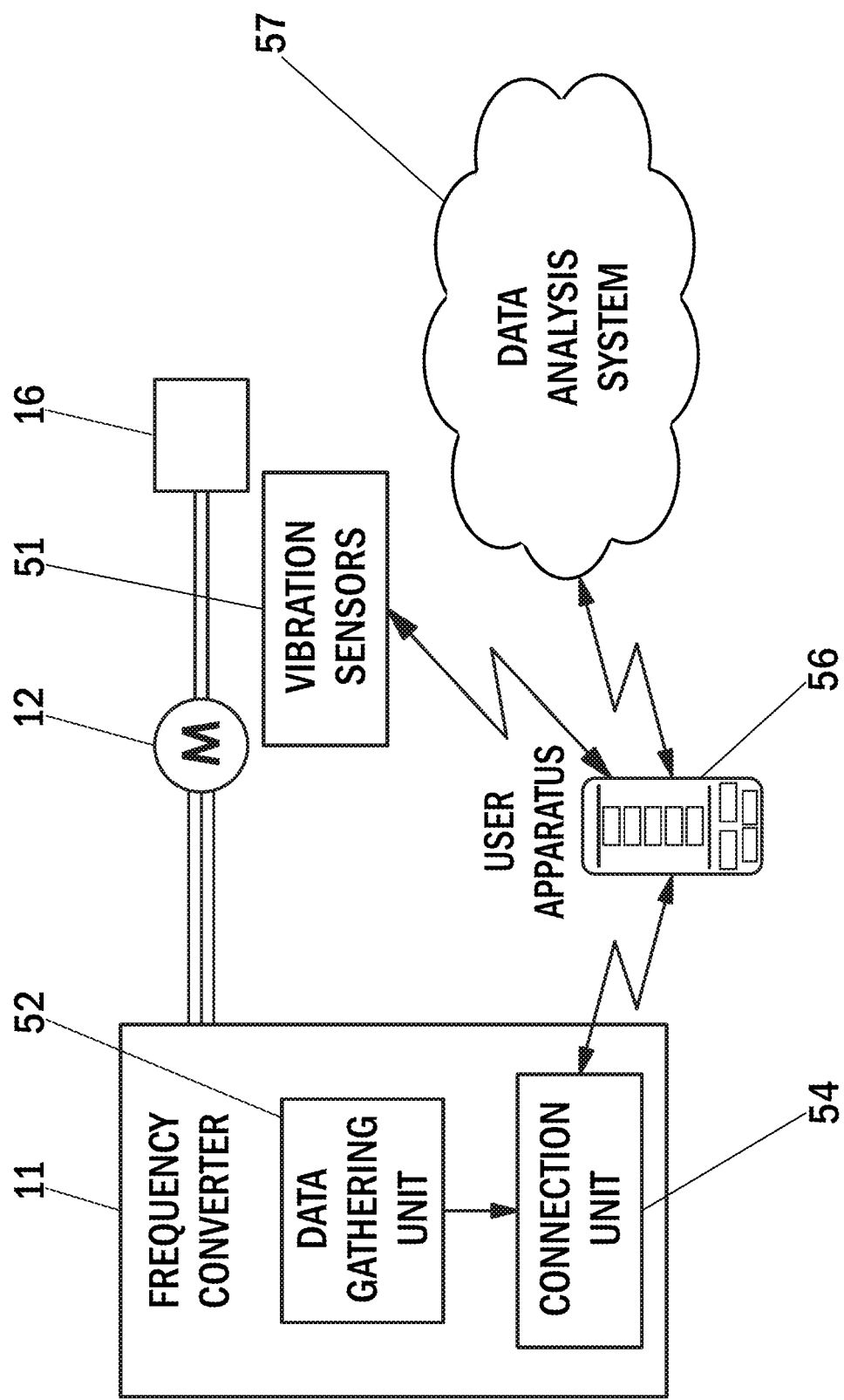
FIG. 8 illustrates a block diagram of a fifth embodiment of an arrangement for controlling lateral vibration of an electric machine according to the present invention.

FIG. 8 illustrates a block diagram of a fifth embodiment of an arrangement for controlling lateral vibration of an electric machine according to the present invention. The presented fifth embodiment of an arrangement for controlling lateral vibration of an electric machine comprises a frequency converter 11, an electric machine 12, a driven/driving machine system 16 connected to said electric machine 12, a user apparatus 56 and an external data analysis system 57. The presented fifth embodiment of an arrangement for controlling lateral vibration of an electric machine comprises one or more vibration sensors 51. In the presented fifth embodiment said external data analysis system 57 is implemented as an external cloud computing service. Whereas in the presented embodiment a driven machine 16 connected to a motor 12 is shown as a driven/driving machine system 16, in another embodiment of the present invention the driven/driving machine system 16 could be replaced by one or more driven/driving machine devices and/or one or more gears/gear arrangements and/or one or more shafts/shaft systems connected to said electric machine 12. Whereas in the presented embodiment a motor is shown as an electric machine, in another embodiment of the present invention the motor could be replaced by a generator as an electric machine.

In presented fifth embodiment of an arrangement for controlling lateral vibration of an electric machine, the vibration data analysis is implemented on an external data analysis system 57. Said external data analysis system 57 may be realized as a partially external data analysis system or as an entirely external data analysis system. In the presented fifth embodiment, the frequency converter 11 comprises a data gathering unit 52 and a connection unit 54.

Said data gathering unit 52 gathers data related to the controlling vibration of an electric machine. Said user apparatus 56 receives said measured vibration data from the vibration sensors 51 wirelessly.

The data gathering unit 52 then forwards said gathered data to the connection unit 54. The connection unit 54 is arranged to receive said gathered data from the data gathering unit 52 and to transmit said gathered data to said data analysis system 57 via said user apparatus 56. So first, the connection unit 54 receives said gathered data from the data gathering unit 52 and transmits said gathered data to said user apparatus 56.

The connection unit 54 is configured to establish a connection with said user apparatus 56. The connection unit 54 may communicate with said user apparatus 56 via standard wireless communication protocols, for example. The connection unit 54 may establish the communication link via Bluetooth, ZigBee, near field communication (NFC), or infrared protocols, for example.

The user apparatus 56 may be a handheld communication device, such as a smart phone or a tablet computer. The user apparatus 56 may be arranged to receive said gathered data from the connection unit 54 of the frequency converter 11 and to forward said gathered data to said external data analysis system 57. Said external data analysis system 57 may be implemented as an external cloud computing service. The user apparatus 56 may be arranged to communicate with said external data analysis system 57 through wireless networks, such as cell phone networks or WLAN.

The data analysis system 57 is arranged to receive said gathered data from the user apparatus 56. The data analysis system 57 may also be arranged to receive user input from the user apparatus 56. The data analysis system 57 then analyses said gathered data and determines, according to the present disclosure, the control torque for controlling lateral vibration of an electric machine. After said determination, the frequency converter 11 is instructed to generate the control torque. Thereafter, the control torque is generated by the frequency converter 11 and exerted on the stator of said motor 12.

With the help of the method and an arrangement for controlling lateral vibration of an electric machine according to the present invention, the horizontal modes of variable frequency drive motors can be actively controlled.

In the present invention, a calculated and determined control torque exerted on the stator. Said control torque is a by-product of the active torque variation exerted on the rotor.

With the help of the method and an arrangement for controlling lateral vibration of an electric machine according to the present invention, the two most important low frequency modes of the electric machine, the first and second horizontal modes can be controlled. Without any design changes of motors or generators, the solution according to the present invention enhances the vibration performance of the electric machine. Furthermore, the solution according to the present invention increases the operating speed range of the electric machine. Furthermore, the solution according to the present invention increases the bearing lifetime of the electric machine. Furthermore, the solution according to the present invention reduces the structure borne noise of the electric machine. Furthermore, the solution according to the present invention can also be used in optimization of the electric machine.

Furthermore, the method and an arrangement for controlling lateral vibration of an electric machine according to the present invention provides easy and efficient solution for an electric machine, the controlled vibration of which can be more efficiently maintained.

It is to be understood that the above description and the accompanying Figures are only intended to teach the best way known to the inventors to make and use the invention. It will be apparent to a person skilled in the art that the inventive concept can be implemented in various ways. The above-described embodiments of the invention may thus be modified or varied, without departing from the invention, as appreciated by those skilled in the art in light of the above teachings. It is therefore to be understood that the invention and its embodiments are not limited to the examples described above but may vary within the scope of the claims and their equivalents.

The invention claimed is:

1. A method for controlling lateral vibration of a variable-frequency-driven electric machine that is an electric motor connected to a driven machine system via a coupling arrangement, said method comprising:

lateral vibration from said variable-frequency-driven electric machine is measured by one or more vibration sensors as measured vibration data, wherein said one or more vibration sensors are attached on the variable-frequency-driven electric machine;

control torque is determined utilizing said measured vibration data as a time-dependent function of measured vibrations, said control torque being a reactive control torque that acts in an opposite direction to an action torque that rotates a rotor of said variable-frequency-driven electric machine; and control torque is generated by a frequency converter and exerted on a stator of said variable-frequency-driven electric machine, wherein said exerted control torque produces a variation of horizontal displacement for suppression of horizontal vibration of said variable-frequency-driven electric machine to compensate the horizontal vibrational displacement of said variable-frequency-driven electric machine, wherein said exerted control torque is used for suppression of horizontal vibration of said variable-frequency-driven electric machine at least to control two low frequency horizontal vibration modes, where a stator-frame and the rotor of said variable-frequency-driven electric machine move horizontally with both ends in a same phase.

2. The method according to claim 1, wherein in generating said control torque:
   a control torque reference is calculated by said frequency converter; and
   control torque is generated by said frequency converter corresponding to said control torque reference.

3. The method according to claim 1, wherein said measured vibration data is utilized for suppression of lateral vibration of said variable-frequency-driven electric machine.

4. The method according to claim 1, wherein lateral vibration from said variable-frequency-driven electric machine is measured from bearings of said variable-frequency-driven electric machine.

5. An arrangement for controlling lateral vibration of a variable-frequency-driven electric machine that is an electric motor connected to a driven machine system via a coupling arrangement, said arrangement comprising:
   a frequency converter, and
   one or more vibration sensors,
   wherein said one or more vibration sensors is/are arranged for measuring the lateral vibration from said variable-frequency-driven electric machine and for producing measured vibration data, wherein said one or more vibration sensors are attached on the variable-frequency-driven electric machine; and
   wherein said frequency converter is arranged for generating a control torque and for exerting said control torque on a stator of said variable-frequency-driven electric machine, said control torque being determined utilizing said measured vibration data as a time-dependent function of measured vibrations, said control torque being a reactive control torque that acts in an opposite direction to an action torque that rotates a rotor of said variable-frequency-driven electric machine, wherein said exerted control torque produces a variation of horizontal displacement for suppression of horizontal vibration of said variable-frequency-driven electric machine to compensate the horizontal vibrational displacement of said variable-frequency-driven electric machine, wherein said exerted control torque is used for suppression of horizontal vibration of said variable-frequency-driven electric machine at least to control two low frequency horizontal vibration modes, where a stator-frame and the rotor of said variable-frequency-driven electric machine move horizontally with both ends in a same phase.

6. The arrangement according to claim 5, wherein in generating said control torque:
   a control torque reference is calculated by said frequency converter; and
   control torque is generated by said frequency converter corresponding to said control torque reference.

7. The arrangement according to claim 5, wherein said one or more vibration sensors comprise one or more vibration sensors attached to bearing/bearings of said variable-frequency-driven electric machine.

8. The arrangement according to claim 5, wherein said frequency converter comprises:
   a data gathering unit arranged for gathering data, said gathered data including control data for said variable-frequency-driven electric machine and measured vibration data of said variable-frequency-driven electric machine; and
   a data analysis unit arranged for analysing said gathered data and for determining the control torque for controlling lateral vibration of said variable-frequency-driven electric machine.

9. The arrangement according to claim 5, wherein said arrangement comprises a data analysis system, and wherein said frequency converter comprises:
   a data gathering unit arranged for gathering data, said gathered data including control data for said variable-frequency-driven electric machine and measured vibration data of said variable-frequency-driven electric machine; and
   a connection unit arranged for transmitting said gathered data to said data analysis system,
   wherein said data analysis system is arranged for analysing said gathered data and for determining the control torque for controlling lateral vibration of said variable-frequency-driven electric machine.

10. The arrangement according to claim 9, wherein said arrangement comprises a user apparatus, and wherein said connection unit arranged for transmitting said gathered data to said data analysis system via said user apparatus, and wherein said user apparatus is arranged for receiving measured vibration data of said variable-frequency-driven electric machine from said one or more vibration sensors and for receiving said gathered data from said connection unit and for forwarding said gathered data to said data analysis system.

11. A frequency converter for controlling lateral vibration of a variable-frequency-driven electric machine that is an electric motor connected to a driven machine system via a coupling arrangement, said frequency converter being arranged:
   to receive horizontal vibration data from one or more vibration sensors arranged for measuring the lateral vibration from said variable-frequency-driven electric machine and for producing measured vibration data, wherein said one or more vibration sensors are attached on the variable-frequency-driven electric machine; and
   to generate a control torque for exerting said control torque on a stator of said variable-frequency-driven electric machine, said control torque being determined utilizing said measured vibration data as a time-dependent function of measured vibrations, wherein said exerted control torque is used for suppression of horizontal vibration of said variable-frequency-driven electric machine at least to control two low frequency horizontal vibration modes, where a stator-frame and the rotor of said variable-frequency-driven electric machine move horizontally with both ends in a same phase.

12. The frequency converter according to claim 11, wherein in generating said control torque:
   a control torque reference is calculated by said frequency converter; and
   control torque is generated by said frequency converter corresponding to said control torque reference.

13. The frequency converter according to claim 11, comprising:
   a data gathering unit arranged for gathering data, said gathered data including control data for said variable-frequency-driven electric machine and measured vibration data of said variable-frequency-driven electric machine; and a data analysis unit arranged for analysing said gathered data and for determining the control torque for controlling lateral vibration of said variable-frequency-driven electric machine.

* * * * *